US009515810B2

(12) United States Patent
Zhao et al.

(10) Patent No.: US 9,515,810 B2
(45) Date of Patent: Dec. 6, 2016

(54) METHOD AND DEVICE FOR DATA TRANSMISSION

(75) Inventors: Yali Zhao, Beijing (CN); Fangli Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 128 days.

(21) Appl. No.: 14/362,923

(22) PCT Filed: Jul. 4, 2012

(86) PCT No.: PCT/CN2012/078163
§ 371 (c)(1),
(2), (4) Date: Jun. 5, 2014

(87) PCT Pub. No.: WO2013/082937
PCT Pub. Date: Jun. 13, 2013

(65) Prior Publication Data
US 2014/0307593 A1    Oct. 16, 2014

(30) Foreign Application Priority Data

Dec. 8, 2011 (CN) .......................... 2011 1 0406399

(51) Int. Cl.
*H04B 7/26* (2006.01)
*H04L 5/00* (2006.01)
(Continued)

(52) U.S. Cl.
CPC .............. *H04L 5/14* (2013.01); *H04B 7/2643* (2013.01); *H04L 5/001* (2013.01); *H04L 5/0073* (2013.01); *H04L 5/1469* (2013.01); *H04W 72/02* (2013.01); *H04W 74/085* (2013.01)

(58) Field of Classification Search
CPC . H04B 7/2463; H04B 7/2643; H04W 72/02; H04W 74/085
See application file for complete search history.

(56) References Cited

U.S. PATENT DOCUMENTS

| 7,881,236 B2 * | 2/2011 | Park ...................... H04W 74/08 370/278 |
| 8,422,410 B2 * | 4/2013 | Park ...................... H04W 74/08 370/252 |

(Continued)

FOREIGN PATENT DOCUMENTS

| CN | 102231643 A | 11/2011 |
| CN | 102255718 A | 11/2011 |

(Continued)

OTHER PUBLICATIONS

Nokia Corporation et al: "Measurement Gaps and DRX Timers", 3GPP Draft; R2-086085 MAC DRX Timers and Measurement Gaps CR, 3rd Generation Partnership Project (3GPP), Mobile Competence Centre ; 650, Route Des Lucioles ; F-06921 Sophia-Antipolis Cedex ; France, No. Prague, Czech Republic; Nov. 4, 2008, XP050321149, [retrieved on Nov. 4, 2008] * section 3.1 *.

(Continued)

*Primary Examiner* — Alpus H Hsu
(74) *Attorney, Agent, or Firm* — Kilpatrick Townsend & Stockton LLP

(57) ABSTRACT

Disclosed are a method and device for data transmission, for improving a data transmission processing solution when a plurality of aggregated cells of user equipment have different TDD UL/DL configurations. The method includes: when the time division duplex up/downlink configurations of a plurality of aggregated cells of user equipment (UE) and only bidirectional data transmission is allowed in an up/downlink collision subframe, the UE determining the allowed data transmission direction of the up/downlink collision subframe, wherein in the time division duplex up/downlink configurations of the plurality of aggregated cells of UE, the data transmission directions of the same up/downlink collision subframe are different; the UE respectively determining available subframes for use in the uplink data transmission direction and available subframes for use in the downlink data transmission direction in each aggregated cell thereof, wherein in the available subframes counted in a data transmission direction opposite to the allowed data transmission direction, the up/downlink collision subframe is not included therein; and the UE performing data transmission in the available subframes.

19 Claims, 6 Drawing Sheets

(51) Int. Cl.
*H04L 5/14* (2006.01)
*H04W 72/04* (2009.01)
*H04W 72/12* (2009.01)
*H04W 72/02* (2009.01)
*H04W 74/08* (2009.01)

(56) References Cited

U.S. PATENT DOCUMENTS

| | | | | |
|---|---|---|---|---|
| 8,457,022 | B2* | 6/2013 | Lindh | H04L 1/1812 370/280 |
| 8,588,701 | B2* | 11/2013 | Wigard | H04W 24/10 370/328 |
| 8,599,782 | B2* | 12/2013 | Chung | H04L 1/1812 370/315 |
| 8,737,333 | B2* | 5/2014 | Chen | H04W 52/365 370/252 |
| 8,971,349 | B2* | 3/2015 | Park | H04W 74/0833 370/336 |
| 9,084,278 | B2* | 7/2015 | Kim | H04W 72/1257 |
| 9,125,188 | B2* | 9/2015 | Tamaki | H04L 1/1854 |
| 2011/0058504 | A1* | 3/2011 | Jo | H04W 72/1263 370/280 |
| 2011/0085509 | A1 | 4/2011 | Park et al. | |
| 2012/0039275 | A1* | 2/2012 | Chen | H04L 1/1607 370/329 |
| 2013/0051288 | A1* | 2/2013 | Yamada | H04W 8/24 370/280 |
| 2013/0308503 | A1* | 11/2013 | Kim | H04L 5/0053 370/280 |
| 2013/0315114 | A1* | 11/2013 | Seo | H04L 5/001 370/280 |
| 2013/0315115 | A1* | 11/2013 | Kim | H04J 11/0056 370/280 |
| 2013/0322378 | A1* | 12/2013 | Guan | H04W 72/1289 370/329 |
| 2013/0329612 | A1* | 12/2013 | Seo | H04J 11/0056 370/280 |
| 2014/0016519 | A1* | 1/2014 | Kim | H04W 72/1263 370/280 |
| 2014/0029490 | A1* | 1/2014 | Kim | H04W 72/1289 370/280 |
| 2014/0050130 | A1* | 2/2014 | Kim | H04L 5/001 370/280 |
| 2014/0241298 | A1* | 8/2014 | Park | H04W 72/0413 370/329 |

FOREIGN PATENT DOCUMENTS

| | | |
|---|---|---|
| CN | 102263627 A | 11/2011 |
| CN | 102523627 A | 6/2012 |
| EP | 2733883 A1 | 5/2014 |
| WO | 2013/007152 A1 | 1/2013 |

OTHER PUBLICATIONS

The Extended European Search Report issued Nov. 5, 2014 for the counterpart European Application 12855317.9, 9 pages.
International Search Report for PCT/CN2012/078163.
3GPP TSG RAN WG1 Meeting #67, San Francisco, Nov. 14-18, 2011; Source: CATT; Title: Design of TOO Inter-band Carrier Aggregation; Agenda Item: 7.2.1.5; Document for: Discussion and Decision.

\* cited by examiner

--Prior Art--

--Prior Art--

METHOD AND DEVICE FOR DATA TRANSMISSION

The present application is a U.S. National Stage of International Application No. PCT/CN2012/078163, filed Jul. 4, 2012, designating the United States, and claiming priority to Chinese Patent application No. 201110406399.X, filed with the State Intellectual Property Office of People's Republic of China on Dec. 8, 2011, and entitled "Data Transmission Methods and Devices", the content of which is hereby incorporated by reference in its entirety.

FIELD

The present invention relates to the technical field of communications, and particularly to data transmission methods and devices.

BACKGROUND

Significantly improved peak rates of 1 Gbps in the downlink and 500 Mbps in the uplink are required for a Long Term Evolution-Advanced (LTE-A) system as compared to a Long Term Evolution (LTE) system. Also good compatibility of the LTE-A system with the LTE system is required. The technology of Carrier Aggregation (CA) is introduced to the LTE-A system to accommodate the required improved peak rates, compatibility with the LTE system and full use of spectrum resources.

The CA technology refers to that a user equipment can simultaneously work on a plurality of cells, and one cell includes a pair of uplink (UL)/downlink (DL) Component Carriers (CCs). The LTE system or any of previous wireless communication systems includes only one pair of CCs. CCs in a carrier aggregation system may be continuous or discontinuous, the bandwidths between the CCs may be the same or different, and to keep compatible with the LTE system, the maximum bandwidth of each CC is limited to 20 MHz. At present, it is generally recognized that the number of cells which may be aggregated by the User Equipment (UE) is 5 at most. Moreover, the carrier aggregated cells are classified in the LTE-A system, namely divided into:

a Primary Cell (PCell): only one cell in the cells aggregated by the UE is defined as the PCell;

Secondary Cells (SCells): all other cells aggregated by the UE except the PCell are referred to as the SCells.

The PCell is selected by a Node B and configured to the user equipment through Radio Resource Control (RRC) signaling, and the PCell of different user equipments may be different. No matter the PCell or the SCells, each cell has an independent Hybrid-ARQ (HARQ) entity which maintains a series of independent processes.

For saving power, a Discontinuous Reception (DRX) mechanism is introduced into the LTE system. Under the DRX mechanism, monitoring by the UE on a Physical Downlink Control Channel (PDCCH) is controlled through timers, and the relevant timers are described as follows.

OnDurationTimer (continuous monitoring timer): the UE periodically wakes and monitors the time of the control channel. The length of the timer is configured through RRC signaling, and has a minimum psf 1 and a maximum psf 200 by taking a PDCCH subframe as a unit (psf). The so-called PDCCH subframe refers to a subframe with the PDCCH.

DrxShortCycleTimer (discontinuous reception short cycle timer): to better match the characteristic of data service arrival, configuration of two DRX cycles (discontinuous reception cycle), namely a long cycle and a short cycle, is allowed in the LTE system. The two cycles has the same onDurationTimer, but has different sleep time. In the short cycle, the sleep time is shorter, and the UE may monitor the control channel again more quickly. The long cycle must be configured, and is the initial state of the DRX process: and the short cycle is optional. A duration adopting the short cycle is set in the DrxShortCycleTimer, and after the DrxShortCycleTimer is overtime, the UE uses the Long cycle. The DrxShortCycleTimer is configured through RRC signaling, and has a length taking the number of the short cycles as a unit, which ranges from 1 to 16.

Drx-InactivityTimer (discontinuous reception-inactivity timer): after the DRX is configured, when the UE receives control signaling of initial transmission of an HARQ within an Active Time allowing monitoring of the control channel, the timer is started, and before the timer is overtime, the UE continuously monitors the control channel. If the UE receives the control signaling of the initial transmission of the HARQ before the Drx-InactivityTimer is overtime, the Drx-InactivityTimer is terminated and restarted. The length of the timer is configured through RRC signaling, and has a minimum psf 1 and a maximum psf 2560 by taking the PDCCH subframe as a unit (psf).

HARQ RTT Timer (hybrid automatic repeat request round-trip timer): the timer is merely applicable to a Downlink (DL), so that the UE may not monitor the control channel before next retransmission arrives, and a better power saving effect is achieved. If the UE receives scheduling signaling of HARQ transmission (initial transmission or retransmission), the timer is started. If data in the corresponding HARQ process are not decoded successfully after last HARQ transmission, namely the UE feeds back NACK (non-acknowledge) information, after the HARQ RTT Timer is overtime, the UE starts a Drx-RetransmissionTimer. If data in the corresponding HARQ process are decoded successfully after last HARQ transmission, namely the UE feeds back ACK (acknowledge) information, after the HARQ RTT Timer is overtime, the UE does not start the Drx-RetransmissionTimer. If only the HARQ RTT Timer runs currently, the UE does not monitor the control channel.

Drx-RetransmissionTimer (discontinuous reception-retransmission timer): the timer is merely applicable to DL. During operation of the Drx-RetransmissionTimer, the UE monitors control signaling, and waits for retransmission scheduling of the corresponding HARQ process. The length of the timer is configured through RRC, and has a minimum psf 1 and a maximum psf 33 by taking the PDCCH subframe as a unit (psf).

From the above-mentioned descriptions, the lengths of the onDurationTimer, the drx-InactivityTimer and the drx-RetransmissionTimer in the timers related to the DRX are counted based on the number of PDCCH subframes. For TDD, the PDCCH subframe refers to a downlink subframe including a Downlink Pilot Time Slot (DwPTS) in a special subframe.

The LTE-A system still uses the DRX mechanism of the LTE system. Just because the LTE-A system adopts the carrier aggregation technology, for how to use the DRX under multiple carriers, the present method is to adopt a common DRX mechanism, namely all cells have the same Active Time.

Random access methods in the LTE system and the LTE-A system in the prior art will be introduced below.

The random access objective of the LTE system is mainly to establish RRC connection or uplink synchronization. At present, two random access schemes are supported, i.e., competitive random access and noncompetitive random access.

The process of the noncompetitive random access is shown in FIG. 1, and mainly includes three steps:

Msg0: an Evolved Node B (eNB) allocates a dedicated Random Access Preamble (ra-PreambleIndex) for the noncompetitive random access and a Physical Random Access Channel (PRACH) Mask Index (ra-PRACH-MaskIndex) for the random access to UE, wherein the information is carried by a PDCCH order for the noncompetitive random access caused by downlink data arrival and carried by a handover command for the noncompetitive random access caused by handover;

Msg1: the UE sends a designated dedicated preamble to the eNB on a designated PRACH resource according to the ra-PreambleIndex and ra-PRACH-MaskIndex indicated in the Msg0, and the eNB receives the Msg1 and then calculates an uplink timing advance according to the Msg1;

Msg2: the eNB sends a random access response including timing advance information to the UE, to inform the UE of the timing advance of follow-up uplink transmission.

The competitive random access flow is shown in FIG. 2, and mainly includes four steps:

Msg1: UE selects a random access preamble and a PRACH resource, and sends the selected random access preamble to an eNB using the PRACH resource;

Msg2: the eNB receives the preamble, calculates a timing advance (TA) and sends a random access response to the UE, wherein the random access response at least includes the timing advance information and an uplink scheduling grant (UL grant) for Msg3;

Msg3: the UE transmits uplink transmission on the UL grant designated in the Msg2, and for different random access reasons, the contents of the uplink transmission in the Msg3 are different, for example, for an initial access, an RRC connection establishment request is transmitted in the Msg3;

Msg4: a competition solution message, the UE may judge whether the random access is successful according to the Msg 4.

The carrier aggregation technology is introduced into the LTE-A system. An R10 version does not support Multi-TA, namely all the cells aggregated by the UE use the same uplink timing advance as the PCell, so the random access merely occurs in the PCell in R10. Different from the R10 version, an LTE-A R11 version supports multi-TA, namely different cells aggregated by the UE use different uplink timing advances. To facilitate maintenance of the multi-TA, a concept of uplink timing advance group (TA group, TAG) is introduced, all cells in one TAG use the same uplink timing advance, wherein the TAG including the PCell is referred to as a PTAG, and the TAGs merely including the SCells are referred to as STAGs. For each TAG, the uplink timing advance needs to be acquired through a random access process. For the PTAG, the acquisition of the uplink timing advance may adopt competitive or noncompetitive random access; and for the STAGs, the uplink timing advance is generally acquired through the noncompetitive random access.

About L2 measurement in the LTE system:

in the LTE system, for the objective of load balance or network performance monitoring by an Operation and Management System (OAM), the protocol defines a series of layer 2 (L2) measurements, including Physical Resource Block (PRB) usage, number of activated UE, packet delay, packet loss rate, scheduling throughput and the like, and the eNB acquires these measurements and then reports the measurement results to the OAM, so that the OAM may master the network performance and adjust and optimize network configurations. Wherein, the PRB usage is measured in two manners:

Total PRB usage: counted in Up-Link (UL) and DL respectively, namely a ratio of the sum of UL/DL PRBs for transmission to the sum of UL/DL available PRBs;

PRB usage per traffic class: counted in UL and DL respectively according to QCIs (Quality of service Class Identifier), namely a ratio of the sum of UL/DL PRBs occupied by a Dedicated Transport Channel (DTCH) for transmitting each QCI class to the sum of UL/DL available PRBs.

About Time Division Duplex (TDD) ULDL configurations:

in R8, R9 or R10, a physical layer standard defines the following seven UL/DL configurations for the TDD system, shown in the following table, wherein D represents a DL subframe. U represents a UL subframe, and S represents a special subframe of the TDD system.

TABLE 1

| TDD UL/DL Configurations | | | | | | | | | | |
|---|---|---|---|---|---|---|---|---|---|---|
| UL/DL | Subframe Number | | | | | | | | | |
| Configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In an R11 system, the CA user equipment of LTE-A may share or use adjacent bands with other systems, such as the LTE system. As shown in FIG. 3, the LTE-A user equipment aggregates three cells: Cell 1, Cell 2 and Cell 3. The Cell 1 and the Cell 2 use the same band (Band 1), whereas the Cell 3 uses Band 2. To avoid uplink/downlink cross interference of the TDD system, the Band 1 and a 3G/LTE TDD Band A should use compossible TDD UL/DL configurations, and the so-called compossible TDD configurations refers to configurations without UL/DL cross interference and refers to the same TDD UL/DL configuration for the LTE system. The Band 2 and a 3G/LTE TDD Band B should use compossible TDD UL/DL configurations. If the TDD ULDL configurations used by the Band A and the Band B are different, the TDD UL/DL configurations used by the Band 1 and the Band 2 are different either.

For the carrier aggregation system, if a plurality of cells aggregated by the user equipment have different TDD ULDL configurations, uplink/downlink collision subframes may be produced, such as subframe #3, subframe #4, subframe #8 and subframe #9 shown in FIG. 4. For processing of the uplink/downlink collision subframes at present, a definite stipulation has not been given in the prior art.

SUMMARY

Embodiments of the present invention provide data transmission methods and devices, for providing a data transmission processing solution when a plurality of cells aggregated by user equipment have different TDD UL/DL configurations.

A data transmission method provided in an embodiment of the present invention includes:

when time division duplex uplink/downlink configurations of a plurality of cells aggregated by a user equipment (UE) are different and only unidirectional data transmission is allowed in an uplink/downlink collision subframe, determining, by the UE, an allowed data transmission direction of the uplink/downlink collision subframe, wherein data transmission directions of a same uplink/downlink collision subframe, in the time division duplex uplink/downlink configurations of the plurality of cells aggregated by the UE, are different;

determining, by the UE, available subframes in an uplink data transmission direction and available subframes in a downlink data transmission direction in each cell aggregated by the UE respectively, wherein available subframes determined in a data transmission direction opposite to the allowed data transmission direction do not include the uplink/downlink collision subframe; and performing, by the UE, data transmission in the available subframes.

A data transmission method provided in an embodiment of the present invention includes:

when time division duplex uplink/downlink configurations of a plurality of cells aggregated by a UE are different and only unidirectional data transmission is allowed in an uplink/downlink collision subframe, determining, by an eNB, an allowed data transmission direction of the uplink/downlink collision subframe, wherein data transmission directions of a same uplink/downlink collision subframe, in the time division duplex uplink/downlink configurations of the plurality of cells aggregated by the UE, are different;

determining, by the eNB, available subframes in an uplink data transmission direction and available subframes in a downlink data transmission direction in each cell aggregated by the UE respectively, wherein available subframes determined in a data transmission direction opposite to the allowed data transmission direction do not include the uplink/downlink collision subframe; and performing, by the eNB, data transmission in the available subframes.

A data transmission device provided in an embodiment of the present invention includes:

a data transmission direction determining component, configured to, when time division duplex uplink/downlink configurations of a plurality of cells aggregated by a UE are different and only unidirectional data transmission is allowed in an uplink/downlink collision subframe, determine allowed data transmission direction of the uplink/downlink collision subframe for the UE, wherein data transmission directions of a same uplink/downlink collision subframe, in the time division duplex uplink/downlink configurations of the plurality of cells aggregated by the UE, are different;

an available subframe determining component, configured to determine available subframes in an uplink data transmission direction and available subframes in a downlink data transmission direction in each cell aggregated by the UE respectively, wherein available subframes determined in a data transmission direction opposite to the allowed data transmission direction do not include the uplink/downlink collision subframe; and a transmission component, configured to perform data transmission in the available subframes.

A data transmission device provided in an embodiment of the present invention includes:

a data transmission direction determining component, configured to, when time division duplex uplink/downlink configurations of a plurality of cells aggregated by a UE are different and only unidirectional data transmission is allowed in an uplink/downlink collision subframe, determine allowed data transmission direction of the uplink/downlink collision subframe for an eNB, wherein data transmission directions of a same uplink/downlink collision subframe, in the time division duplex uplink/downlink configurations of the plurality of cells aggregated by the UE, are different;

an available subframe determining component, configured to determine available subframes in an uplink data transmission direction and available subframes in a downlink data transmission direction in each cell aggregated by the UE respectively wherein available subframes determined in a data transmission direction opposite to the allowed data transmission direction do not include the uplink/downlink collision subframe; and a transmission component, configured to perform data transmission in the available subframes.

According to the embodiments of the present invention, when time division duplex uplink/downlink configurations of a plurality of cells aggregated by a UE are different and only unidirectional data transmission is allowed in an uplink/downlink collision subframe, the UE determines allowed data transmission direction of the uplink/downlink collision subframe, wherein data transmission directions of the same uplink/downlink collision subframe in the time division duplex uplink/downlink configurations of the plurality of cells aggregated by the UE are different; the UE determines available subframes in an uplink data transmission direction and available subframes in a downlink data transmission direction in each cell aggregated by the UE respectively, wherein available subframes determined in a data transmission direction opposite to the allowed data transmission direction do not include the uplink/downlink collision subframe; and the UE performs data transmission in the available subframes. That is, a data transmission processing solution, when a plurality of cells aggregated by a user equipment have different TDD UL/DL configurations, is provided, so that the processing of the uplink/downlink collision subframe in each process is definite.

DETAILED DESCRIPTION

Embodiments of the present invention provide data transmission methods and devices, for providing a data transmission processing solution when a plurality of cells aggregated by a user equipment have different TDD UL/DL configurations.

In an embodiment of the present invention, when time division duplex uplink/downlink configurations of a plurality of cells aggregated by a user equipment are different, data transmission directions of a same uplink/downlink collision subframe in the time division duplex uplink/downlink configurations of the plurality of cells aggregated by the UE are different.

In an embodiment of the present invention, uplink data transmission and downlink data transmission can not be performed in one uplink/downlink collision subframe, and only unidirectional data transmission can be performed, for example, only uplink data transmission or only downlink data transmission can be performed.

In a carrier aggregation system, different TDD UL/DL configurations can be configured for a plurality of cells aggregated by a user equipment. If transmission directions of a subframe in different cells aggregated by the user equipment are different, the subframe may be referred to as an uplink/downlink collision subframe. The uplink/downlink collision subframe is only allowed to transmit in one direction, and based on this, an embodiment of the present invention provides a method for processing an uplink/downlink collision subframe in determining available subframes, thereby a data transmission processing solution when a plurality of cells aggregated by a user equipment have different TDD UL/DL configurations is provided.

In an embodiment of the present invention, when the plurality of cells aggregated by the user equipment have different TDD UL/DL configurations and the uplink/downlink collision subframe in different cell UL/DL configurations only allows unidirectional data transmission, the allowed data transmission direction of the uplink/downlink collision subframe is determined, and when available subframes in a direction opposite to the allowed data transmission direction are determined, the uplink/downlink collision subframe is not included in the available subframes.

For example, if only UL data transmission is allowed in the uplink/downlink collision subframe, normal UL data transmission may be performed in the uplink/downlink collision subframe in a cell of which the uplink/downlink collision subframe is UL, but transmission is not allowed in the uplink/downlink collision subframe in a cell of which the uplink/downlink collision subframe is DL, and the uplink/downlink collision subframe is not considered when DL available subframes are counted.

Figure 1:
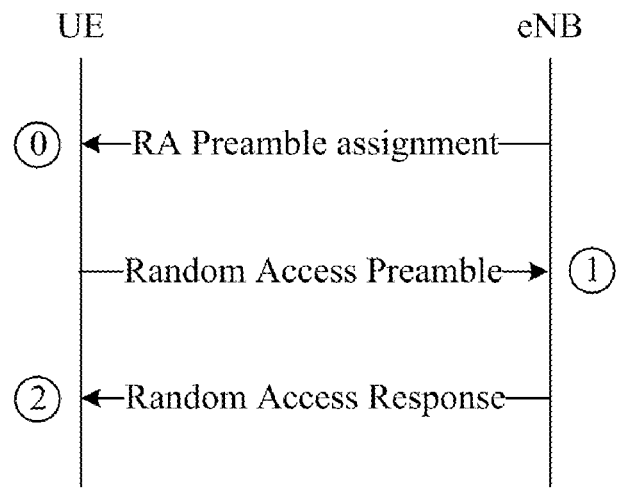
FIG. 1 is a schematic diagram of a noncompetitive random access flow.
Figure 2:
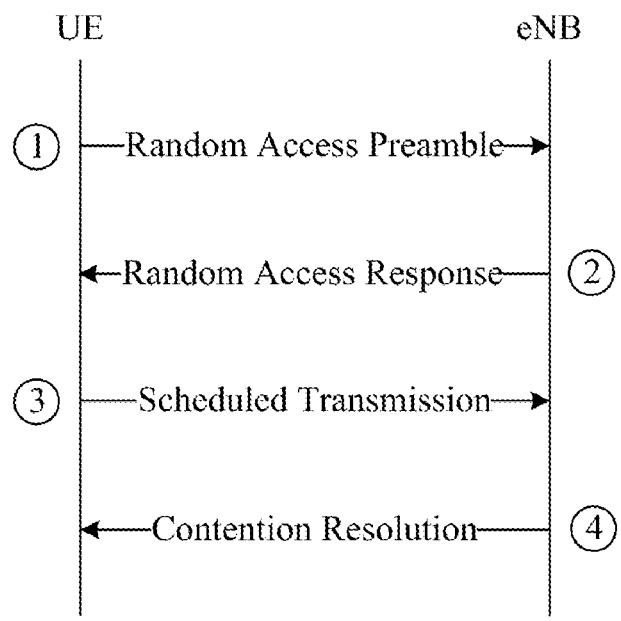
FIG. 2 is a schematic diagram of a competitive random access flow.
Figure 3:
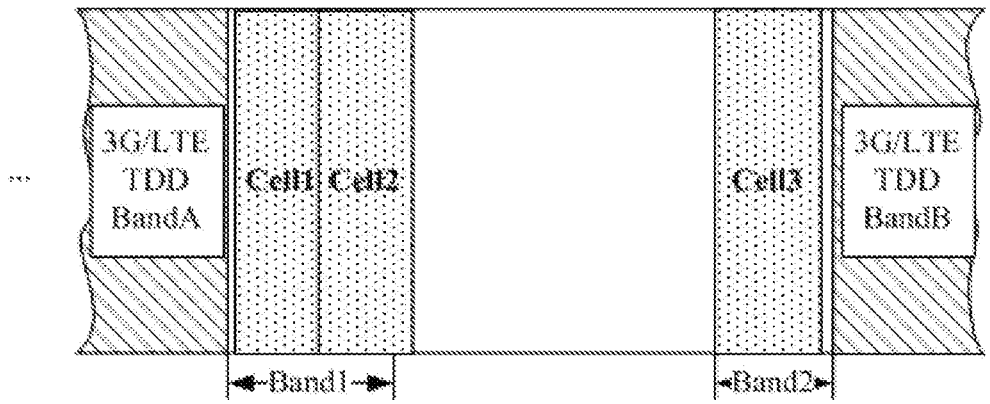
FIG. 3 is a schematic diagram showing that different bands aggregated by an LTE-A CA user equipment use different uplink/downlink configurations.
Figure 4:
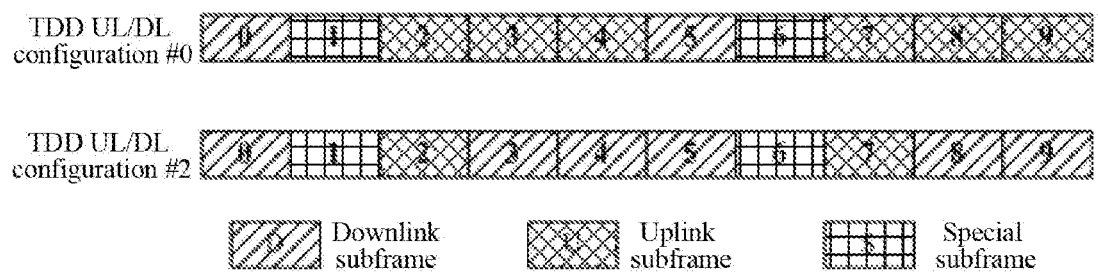
FIG. 4 is a schematic diagram of uplink/downlink collision subframes in multiple TDD configurations.
Figure 5:
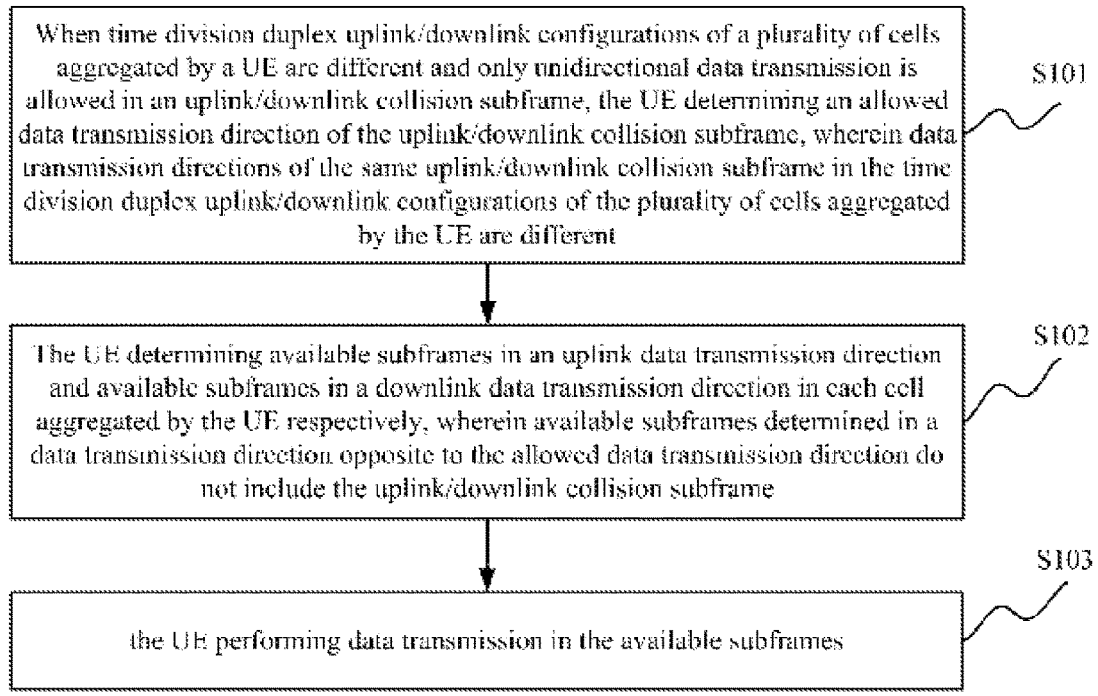
FIG. 5 is a flow chart of a data transmission method at a UE side according to an embodiment of the present invention.

At a UE side, with reference to FIG. 5, a data transmission method according to an embodiment of the present invention includes:

S101, when time division duplex uplink/downlink configurations of a plurality of cells aggregated by a UE are different and only unidirectional data transmission is allowed in an uplink/downlink collision subframe, the UE determining an allowed data transmission direction of the uplink/downlink collision subframe, wherein data transmission directions of the same uplink/downlink collision subframe in the time division duplex uplink/downlink configurations of the plurality of cells aggregated by the UE are different;

S102, the UE determining available subframes in an uplink data transmission direction and available subframes in a downlink data transmission direction in each cell aggregated by the UE respectively, wherein available subframes determined in a data transmission direction opposite to the allowed data transmission direction do not include the uplink/downlink collision subframe; and S103, the UE performing data transmission in the available subframes.

Preferably, when available subframes are Physical Downlink Control Channel (PDCCH) subframes, the available subframes determined by the UE in each cell aggregated by the UE include:

all downlink subframes or downlink pilot time slot subframes including PDCCH or dedicated physical downlink control channel (R-PDCCH) or enhanced physical downlink control channel (E-PDCCH) in the cell; or, all non-collision subframes including PDCCH or R-PDCCH or E-PDCCH in the cell, and uplink/downlink collision subframes capable of performing downlink transmission and including the PDCCH or R-PDCCH or E-PDCCH.

Preferably, when a running time length of a DRX timer taking a PDCCH subframe as a length counting unit is counted, one of the following manners is adopted:

manner I: PDCCH subframes in a union or an intersection of PDCCH subframes in all the cells aggregated by the UE are counted, wherein the uplink/downlink collision subframe is not comprised in the counted PDCCH subframes, or, when the uplink/downlink collision subframe is used for downlink data transmission in a cell and comprises the PDCCH or R-PDCCH or E-PDCCH, the uplink/downlink collision subframe is used as a PDCCH subframe of the cell for counting;

manner II: PDCCH subframes in a PCell of the UE are counted, wherein the uplink/downlink collision subframe is not comprised in the counted PDCCH subframes, or, when the uplink/downlink collision subframe is capable of performing downlink transmission in the PCell and comprises the PDCCH or R-PDCCH or E-PDCCH, the uplink/downlink collision subframe is used as a PDCCH subframe for counting;

manner III: PDCCH subframes in a cell with most or least PDCCH subframes are counted, wherein the uplink/downlink collision subframe is not comprised in the counted PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe of the cell for counting.

Preferably, when the DRX timer is a discontinuous reception-retransmission timer, PDCCH subframes are counted in the following manner:

manner IV: PDCCH subframes in a cell where retransmission is triggered are counted, wherein the uplink/downlink collision subframe is not comprised in the PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe for counting.

Preferably, when available subframes are the ones of Msg1 in a noncompetitive random access process, the first uplink subframe satisfying the following two conditions and having an available physical random access channel resource is used as an available subframe of the Msg1:

condition I: a subframe number is $n+k_2$;

wherein, n represents subframe number of a subframe from which a PDCCH order is received by the UE, $k_2$ is a preset variable, and $k_2 \geq 6$;

condition II: in a cell sending a random access preamble, the uplink subframe is an uplink/downlink non-collision subframe or an uplink/downlink collision subframe capable of performing uplink transmission in the cell.

Preferably, when available subframes are the ones of Msg3 in the competitive random access process, if a UL delay field is 0, the first uplink subframe satisfying the following two conditions is used as an available subframe of the Msg3:

condition I: a subframe number is $n+k_1$;

wherein, n represents the subframe number of a subframe from which a random access response is received by the UE, $k_1$ is a preset variable, and $k_1 \geq 6$;

condition II: in a cell sending the Msg3, the uplink subframe is an uplink/downlink non-collision subframe or an uplink/downlink collision subframe capable of performing uplink transmission in the cell.

Preferably, when available subframes are the ones of Msg3 in the competitive random access process, if the UL delay field is 1, the second uplink subframe satisfying the following two conditions is used as an available subframe of the Msg3:

condition I: the subframe number is $n+k_1$;

wherein, n represents the subframe number of a subframe from which a random access response is received by the UE, $k_1$ is a preset variable, and $k_1 \geq 26$;

condition II: in a cell sending the Msg3, the uplink subframe is an uplink/downlink non-collision subframe or an uplink/downlink collision subframe capable of performing uplink transmission in the cell.

Preferably, the method also includes:

the UE informing an eNB of capability information, on whether the UE supports both uplink and downlink data transmission in an uplink/downlink collision subframe, through capability reporting information.

Preferably, the method also includes:

the UE determining according to its own capability or signaling indication from the eNB that the UE has to perform data transmission using the method according to an embodiment of the present invention.

Figure 9:
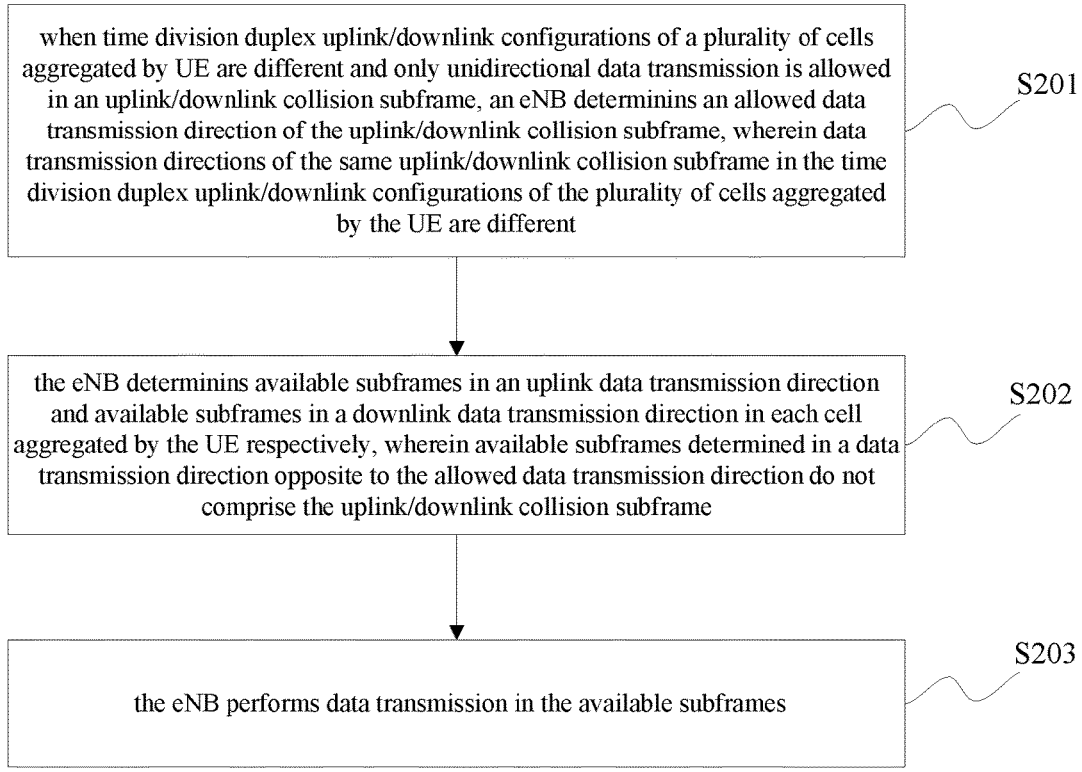
FIG. 9 is a flow chart of a data transmission method at a network/eNB side according to an embodiment of the present invention.

At a network side, with reference to FIG. 9, a data transmission method according to an embodiment of the present invention includes:

S201 when time division duplex uplink/downlink configurations of a plurality of cells aggregated by a UE are different and only unidirectional data transmission is allowed in an uplink/downlink collision subframe, an eNB determines an allowed data transmission direction of the uplink/downlink collision subframe, wherein data transmission directions of a same uplink/downlink collision subframe in the time division duplex uplink/downlink configurations of the plurality of cells aggregated by the UE are different;

S202 the eNB determines available subframes in an uplink data transmission direction and available subframes in a downlink data transmission direction in each cell aggregated by the UE respectively, wherein available subframes determined in a data transmission direction opposite to the allowed data transmission direction do not include the uplink/downlink collision subframe;

S203 the eNB performs data transmission in the available subframes.

Preferably, when available subframes are PDCCH subframes, the available subframes determined by the eNB in each cell aggregated by the UE include:

all downlink subframes or downlink pilot time slot subframes including PDCCH or RN R-PDCCH or E-PDCCH in the cell; or, all non-collision subframes including PDCCH or R-PDCCH or E-PDCCH in the cell, and uplink/downlink collision subframes capable of performing downlink transmission and including the PDCCH or R-PDCCH or E-PDCCH.

Preferably, when the running time length of a DRX timer taking a PDCCH subframe as a length counting unit is counted, one of the following manners is adopted:

manner I: PDCCH subframes in a union or an intersection of PDCCH subframes in all the cells aggregated by the UE are counted, wherein the uplink/downlink collision subframe is not comprised in the counted PDCCH subframes, or, when the uplink/downlink collision subframe is used for downlink data transmission in a cell and comprises the PDCCH or R-PDCCH or E-PDCCH, the uplink/downlink collision subframe is used as a PDCCH subframe of the cell for counting;

manner II: PDCCH subframes in a PCell of the UE are counted, wherein the uplink/downlink collision subframe is not comprised in the counted PDCCH subframes, or, when the uplink/downlink collision subframe is capable of performing downlink transmission in the PCell and comprises the PDCCH or R-PDCCH or E-PDCCH, the uplink/downlink collision subframe is used as a PDCCH subframe for counting;

manner III: PDCCH subframes in a cell with most or least PDCCH subframes are counted, wherein the uplink/downlink collision subframe is not comprised in the counted PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe of the cell for counting.

Preferably, when the DRX timer is a discontinuous reception-retransmission timer, PDCCH subframes are counted in the following manner:

manner IV: PDCCH subframes in a cell where retransmission is triggered are counted, wherein the uplink/downlink collision subframe is not comprised in the PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe for counting.

Preferably, when available subframes are the ones of Msg1 in a noncompetitive random access process, the eNB takes the first uplink subframe satisfying the following two conditions and having an available packet random access channel resource as an available subframe of the Msg1:

condition I: the subframe number is $n+k_2$;

wherein, n represents the subframe number of a subframe from which a PDCCH order is received by the UE, $k_2$ is a preset variable, and $k_2 \geq 6$;

condition II: in a cell sending a random access preamble, the uplink subframe is an uplink/downlink non-collision subframe or an uplink/downlink collision subframe capable of performing uplink transmission in the cell.

Preferably, when available subframes are the ones of Msg3 in the competitive random access process, if a UL delay field is 0, the eNB takes the first uplink subframe satisfying the following two conditions as an available subframe of the Msg3:

condition I: the subframe number is n+$k_1$;

wherein, n represents the subframe number of a subframe from which a random access response is received by the UE, $k_1$ is a preset variable, and $k_1 \geq 6$;

condition II: in a cell sending the Msg3, the uplink subframe is an uplink/downlink non-collision subframe or an uplink/downlink collision subframe capable of performing uplink transmission in the cell.

Preferably, when available subframes are the ones of Msg3 in the competitive random access process, if the UL delay field is 1, the eNB takes the second uplink subframe satisfying the following two conditions as an available subframe of the Msg3:

condition I: the subframe number is n+$k_1$;

wherein, n represents the subframe number of a subframe from which a random access response is received by the UE, $k_1$ is a preset variable, and $k_1 \geq 6$;

condition II: in a cell sending the Msg3, the uplink subframe is an uplink/downlink non-collision subframe or an uplink/downlink collision subframe capable of performing uplink transmission in the cell.

Preferably, when the eNB needs to measure total PRB usage and PRB usage per traffic class, all available PRBs within a counting time T are determined by adopting one of the following manners:

manner I: the sum of PRBs included in subframes, the transmission direction of which is the same as a counting transmission direction, in all cells within the time T is calculated, wherein PRBs included in the uplink/downlink collision subframe are not included in the sum;

manner II: the sum of PRBs included in subframes, the transmission direction of which is the same as a counting transmission direction, in all cells within the time T is calculated, wherein when the determined allowed data transmission direction of the uplink/downlink collision subframe is the same as the counting transmission direction, the number of PRBs in the uplink/downlink collision subframe in a cell capable of performing data transmission in the counting transmission direction is included in the sum.

Preferably, the method also includes:

the eNB determining according to UE capability reported by the UE that data transmission has to be performed using the method according to an embodiment of the present invention.

Preferably, the method also includes:

the eNB determining whether the UE needs to perform parallel transmission in the uplink/downlink collision subframe according to the UE capability or a preset rule, and informing the UE of the determination result through signaling (such as RRC, MAC or PDCCH signaling).

The technical solution according to an embodiment of the present invention includes:

when the running time of a DRX timer (including onDurationTimer, drx-RetransmissionTimer and drx-InactivityTimer) taking a PDCCH subframe as a length counting unit is counted, the uplink/downlink collision subframes may not be considered, or only when the uplink/downlink collision subframes are used for downlink data transmission, the uplink/downlink collision subframes are considered.

If it is determined that the uplink/downlink collision subframes can only perform downlink data transmission, then during determining the uplink subframes sending Msg1 and Msg3 in the random access process, the uplink/downlink collision subframes are considered as unavailable.

About the Msg1 in the noncompetitive random access process:

if the user equipment receives Msg0 in the noncompetitive random access process in a subframe n, the user equipment needs to send the Msg1 in the noncompetitive random access process in the first uplink subframe satisfying the following two conditions and having an available PRACH resource:

condition I: the subframe number satisfies n+$k_2$ ($k_2 \geq 6$);

condition II: in a cell sending a random access preamble, the uplink subframe is an uplink/downlink non-collision subframe or an uplink/downlink collision subframe capable of performing uplink transmission in the cell.

About the Msg3 in the competitive random access process:

if the user equipment receives Msg2 in the competitive random access process in a subframe n and the UL delay field is set as 0, the user equipment needs to send the Msg3 in the first uplink subframe satisfying the following two conditions:

condition I: the subframe number satisfies n+$k_1$ ($k_1 \geq 6$);

condition II: in a cell sending the Msg3, the uplink subframe is an uplink/downlink non-collision subframe or an uplink/downlink collision subframe capable of performing uplink transmission in the cell.

Alternatively, if the UL delay field is set as 1, the user equipment needs to send the Msg3 in the second uplink subframe satisfying the following two conditions:

condition I: the subframe number satisfies n+$k_1$ ($k_1 \geq 6$);

condition II: in a cell sending the Msg3, the uplink subframe is an uplink/downlink non-collision subframe or an uplink/downlink collision subframe capable of performing uplink transmission in the cell.

When the eNB measures Total PRB usage and PRB usage per traffic class of L2, if the uplink/downlink collision subframe is merely used for transmission in a certain direction, two processing manners may be involved when all available PRBs in the opposite direction are counted:

manner I: the uplink/downlink collision subframe is completely not counted:

manner II: the sum of PRBs included in the subframes, the transmission direction of which is the same as a counting transmission direction, in all cells within the time T is calculated, wherein when the determined allowed data transmission direction of the uplink/downlink collision subframe is the same as the counting transmission direction, the number of PRBs in the uplink/downlink collision subframe in the cell capable of performing data transmission in the counting transmission direction is included in the sum.

It should be noted that due to different capabilities of UEs in the system, part of UEs may support both uplink and downlink data transmission in the uplink/downlink collision subframe, part of UEs may not support both uplink and downlink data transmission in the uplink/downlink collision subframe, and whether the uplink/downlink collision subframe processing manner according to an embodiment of the present invention is adopted may be determined by two methods:

the UE itself determines whether the uplink/downlink collision subframe processing manner according to the embodiment of the present invention is enabled according to the UE capability, the eNB determines whether the uplink/downlink collision subframe processing manner according to the embodiment of the present invention is enabled according to the UE capability reported by the UE, and the eNB and the user equipment need to keep the comprehension consistent; and the UE determines whether the uplink/downlink collision subframe processing manner according to the embodiment of the present invention is enabled according to signaling indication from the eNB, wherein the signaling may be RRC signaling, MAC signaling or PDCCH signaling.

Specific embodiments will be illustrated below.

Figure 6:
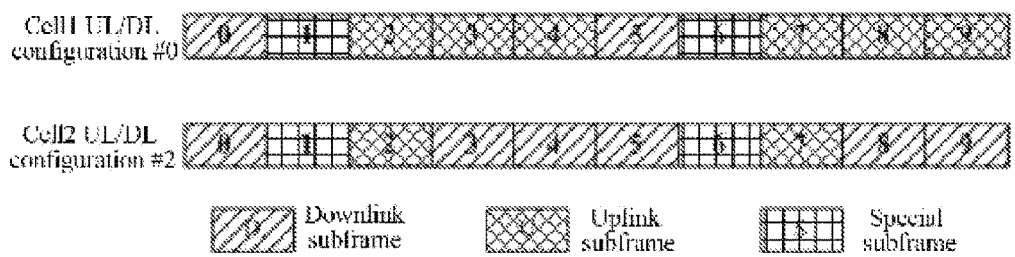
FIG. 6 is a schematic diagram showing that a plurality of cells aggregated by a UE adopt different TDD uplink/downlink configurations according to an embodiment of the present invention.

In the embodiments of the present invention, assuming that a user equipment aggregates two cells, namely Cell 1 and Cell 2, wherein the Cell 2 is a PCell, and the Cell 1 and the Cell 2 belong to different TAGs. The Cell 1 and the Cell 2 adopt TDD configuration #0 and TDD configuration #2 respectively, as shown in FIG. 6, and based on the assumption above, the embodiments of the present invention are as follows.

Embodiment 1: The available subframes are PDCCH subframes. Wherein, the PDCCH subframes are DL subframes or DwPTs, and include a PDCCH or E-PDCCH or R-PDCCH.

The length of the onDurationTimer, drx-InactivityTimer or drx-RetransmissionTimer may be counted in the following several manners.

Manner I: PDCCH subframes in a union or an intersection of PDCCH subframes in all the cells aggregated by the UE are counted, wherein uplink/downlink collision subframes are completely not considered, or when the uplink/downlink collision subframes are used for DL data transmission, the subframes may also be used as PDCCH subframes for counting.

Taking the union of the PDCCH subframes in all the cells aggregated by the UE as an example, the PDCCH subframes in each cell need to be determined first. If the uplink/downlink collision subframes are completely not considered, the PDCCH subframes in each cell are downlink subframes or downlink subframes including DwPTS, including the PDCCH or R-PDCCH or E-PDCCH in the cell According to the above-mentioned principle, the PDCCH subframes corresponding to each cell in the embodiment is subframes {#0, #1, #5 and #6}, namely the union of the PDCCH subframes is still subframes {#0, #1, #5 and #6}. If the uplink/downlink collision subframes are considered, only when the uplink/downlink collision subframes may be used for downlink data transmission in the cell and include the PDCCH or E-PDCCH or R-PDCCH, the uplink/downlink collision subframes are used as PDCCH subframes. Assuming that all the collision subframes are used for downlink data transmission, according to the above-mentioned principle, for the Cell 1, the PDCCH subframes include subframes {#0, #1, #5 and #6}; and for the Cell 2, the PDCCH subframes include subframes {#0, #1, #3, #4, #5, #6, #8 and #9}, namely the union of the PDCCH subframes is {#0, #1, #3, #4, #5, #6, #8 and #9}.

Manner II: PDCCH subframes in a PCell of the UE are counted, wherein the uplink/downlink collision subframes are completely not considered, or if the uplink/downlink collision subframes may be used for DL transmission in the PCell, the subframes may also be used as PDCCH subframes for counting.

If the uplink/downlink collision subframes are completely not considered in counting of the PDCCH subframes, the corresponding PDCCH subframes in the assumption of the embodiment should include subframes (#0, #1, #5 and #6). If the uplink/downlink collision subframes are determined for only UL transmission, the obtained counting result of the PDCCH subframes is the same as that when the uplink/downlink collision subframes are not considered. However, if the uplink/downlink collision subframes may be used for DL transmission, the corresponding PDCCH subframes should include subframes {#0, #1, #3, #4, #5, #6, #8 and #9}.

Manner III: PDCCH subframes in a cell with most or least PDCCH subframes are counted, wherein the UL/DL collision subframes are completely not included in the counted PDCCH subframes, or if the uplink/downlink collision subframes may perform DL transmission in the cell, the subframes may also be used as PDCCH subframes for counting.

Moreover, the length of the drx-RetransmissionTimer may be counted in the following manners:

manner IV: PDCCH subframes in a cell where retransmission is triggered are counted, wherein the uplink/downlink collision subframes may be completely not considered, or, if the uplink/downlink collision subframes may perform DL transmission in the cell the subframes may also be used as PDCCH subframes for counting.

Embodiment 2: The available subframes are the ones of Msg1 in a noncompetitive random access process.

Suppose that the user equipment first establishes an RRC connection with the eNB in the Cell 2 (namely the Cell 2 is a PCell), and due to a UL data transmission requirement, the eNB needs to add an SCell (namely Cell 1) for the user equipment. Because the SCell and the PCell are not in the same TAG, the eNB needs to send a PDCCH order in the Cell 2 to trigger the random access in the Cell 1. Suppose that the receiving time of the PDCCH order in the Cell 2 is SFN (wireless frame number)=N and the subframe number n=8, the user equipment may send the Msg1 in an uplink subframe satisfying the following two conditions:

condition I: the subframe number satisfies $n+k_2$, wherein, $k_2 \geq 6$;

condition II: in a cell sending the Msg1, the uplink subframe is an uplink/downlink non-collision subframe or an uplink/downlink collision subframe capable of performing uplink transmission.

The Msg1 sending time determined according to the above-mentioned condition I is SFN=N+1 and the subframe number is n=4, but because the subframe 4 is an uplink/downlink collision subframe, if this subframe may perform UL transmission in the Cell 1 according to an uplink/downlink collision subframe sending direction selection strategy, for example, the transmission in the PCell or in a certain direction is preferred or control information is preferentially transmitted, then this subframe may be selected as an Msg1 sending subframe, namely satisfies the condition II;

Alternatively, if this subframe needs to perform DL transmission in the Cell 2 according to the uplink/downlink collision subframe sending direction selection strategy, then this subframe can not be used for sending the Msg1, and a delay to the next UL subframe satisfying the condition is needed, namely the sending time of the Msg1 in the Cell 1 should be SFN=N+1 and the subframe number n=7.

Embodiment 3: The available subframes are the ones of Msg3 in a competitive random access process.

Suppose that the user equipment first establishes an RRC connection with the eNB in the Cell 2 (namely the Cell 2 is a PCell), and due to a UL data transmission requirement, the eNB needs to add an SCell (namely Cell 1) for the user equipment. Because the SCell and the PCell are not in the same TAG, the eNB needs to send a PDCCH order in the Cell 2 to trigger the random access in the Cell 1. Suppose that the time when the user equipment receives Msg2 in the Cell 1 is SFN=N and the subframe number n=0.

Situation I: if a UL delay field is set as 0, the user equipment may send the Msg3 in the first uplink subframe satisfying the following two conditions:

condition I: the subframe number satisfies n+$k_1$ ($k_1 \geq 6$);

condition II: in a cell sending the Msg3, the uplink subframe is an uplink/downlink non-collision subframe or an uplink/downlink collision subframe capable of performing uplink transmission.

The Msg3 sending time selected according to the condition I should be SFN=N and the subframe number n=7. Because the subframe is not an uplink/downlink collision subframe, the Msg3 may be normally sent.

Situation II: if the UL delay field is set as 1, the user equipment may send the Msg3 in the second uplink subframe satisfying the following two conditions:

condition I: the subframe number satisfies n+$k_1$ ($k_1 \geq 6$);

condition II: in a cell sending the Msg3, the uplink subframe is an uplink/downlink non-collision subframe or an uplink/downlink collision subframe capable of performing uplink transmission.

The Msg3 sending time selected according to the condition I should be SFN=N and the subframe number n=8. However, because the subframe 8 is an uplink/downlink collision subframe, if this subframe may perform UL transmission in the Cell 1 according to the uplink/downlink collision subframe sending direction selection strategy, then this subframe may be selected as an Msg1 sending subframe, namely satisfies the condition II;

Alternatively, if this subframe needs to perform DL transmission in the Cell 2 according to the uplink/downlink collision subframe sending direction selection strategy, then this subframe can not be used for sending the Msg1. Whether the next subframe satisfies the condition II needs to be judged, if so, the sending time of the Msg1 in the Cell 1 is SFN=N and the subframe number n=9. If the subframe 9 still does not satisfy the condition II, a further delay to the next UL subframe is needed, namely the sending time of the Msg1 in the Cell 1 is SFN=N and the subframe number n=9.

Embodiment 4: L2 Measurement Embodiment

For measuring of L2 measurements including Total PRB usage and PRB usage per traffic class, the number of total available PRBs within the time T may be measured in the following two manners. Taking the DL Total PRB Usage as an example for illustrating, other measurements and counting manners thereof are similar.

For measuring of the DL Total PRB Usage, the sum of all available PRBs for DL transmission within the time T needs to be counted in the following several manners:

manner I: only counting the sum of the PRBs included in DL subframes in the Cell 1 and the Cell 2 within the time T without considering uplink/downlink collision subframes;

manner II: counting the sum of the PRBs included in DL subframes of uplink/downlink non-collision subframes in the Cell 1 and the Cell 2 within the time T, and then adding the sum of the PRBs in DL subframes for DL transmission in uplink/downlink collision subframes.

Figure 7:
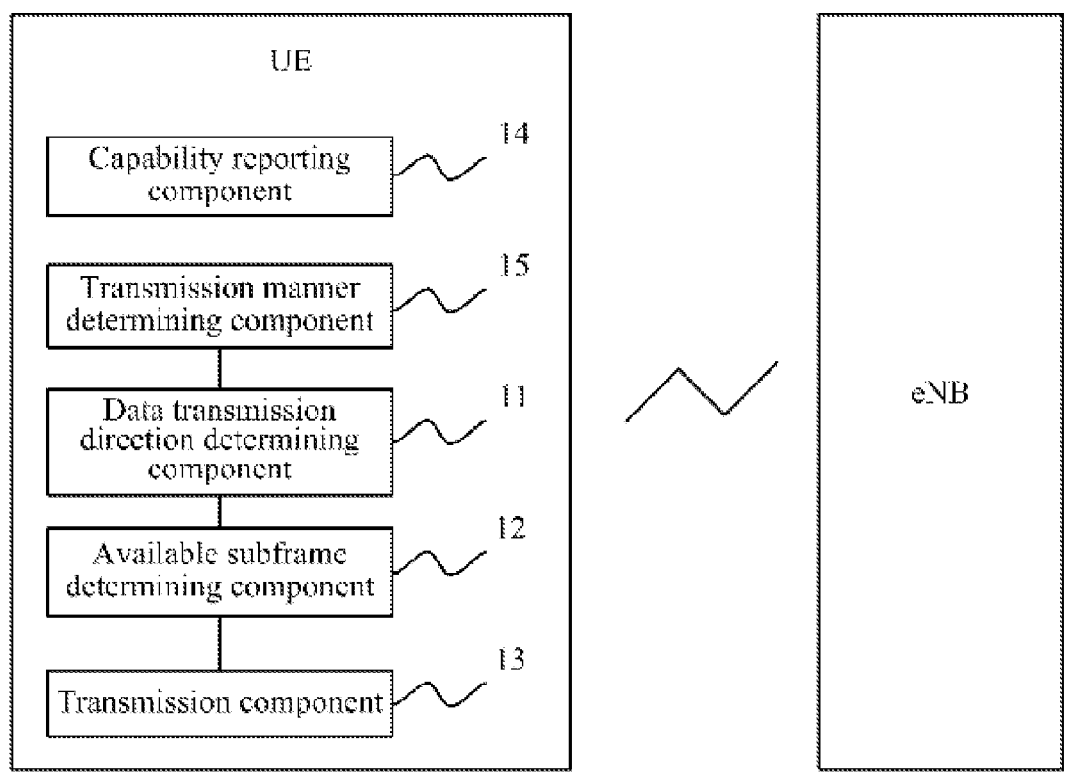
FIG. 7 is a schematic structural diagram of a data transmission device at a UE side according to an embodiment of the present invention.

At a UE side, with reference to FIG. 7, a data transmission device according to an embodiment of the present invention includes:

a data transmission direction determining component 11, configured to, when time division duplex uplink/downlink configurations of a plurality of cells aggregated by UE are different and only unidirectional data transmission is allowed in an uplink/downlink collision subframe, determine an allowed data transmission direction of the uplink/downlink collision subframe for the UE, wherein data transmission directions of the same uplink/downlink collision subframe in the time division duplex uplink/downlink configurations of the plurality of cells aggregated by the UE are different;

an available subframe determining component 12, configured to determine available subframes in an uplink data transmission direction and available subframes in a downlink data transmission direction in each cell aggregated by the UE respectively, wherein available subframes determined in a data transmission direction opposite to the allowed data transmission direction do not comprise the uplink/downlink collision subframe; and a transmission component 13, configured to perform data transmission in the available subframes.

Preferably, when the available subframes are PDCCH subframes, the available subframes determined by the available subframe determining component 12 in each cell aggregated by the UE include:

all downlink subframes or all downlink subframes including DwPTS, including PDCCH or RN R-PDCCH or E-PDCCH in the cell: or, all non-collision subframes including PDCCH or R-PDCCH or E-PDCCH in the cell, and uplink/downlink collision subframes capable of performing downlink transmission and including the PDCCH or R-PDCCH or E-PDCCH.

Preferably, the available subframe determining component 12 counts the running time length of a DRX timer taking a PDCCH subframe as a length counting unit by adopting one of the following manners:

manner I: PDCCH subframes in a union or an intersection of PDCCH subframes in all the cells aggregated by the UE are counted, wherein the uplink/downlink collision subframe is not comprised in the counted PDCCH subframes, or, when the uplink/downlink collision subframe is used for downlink data transmission in a cell and comprises the PDCCH or R-PDCCH or E-PDCCH, the uplink/downlink collision subframe is used as a PDCCH subframe of the cell for counting;

manner II: PDCCH subframes in a PCell of the UE are counted, wherein the uplink/downlink collision subframe is not comprised in the counted PDCCH subframes, or, when the uplink/downlink collision subframe is capable of performing downlink transmission in the PCell and comprises the PDCCH or R-PDCCH or E-PDCCH, the uplink/downlink collision subframe is used as a PDCCH subframe for counting;

manner III: PDCCH subframes in a cell with most or least PDCCH subframes are counted, wherein the uplink/downlink collision subframe is not comprised in the counted PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe of the cell for counting.

Preferably, when the DRX timer is a discontinuous reception-retransmission timer, the manners of counting the PDCCH subframes also include:

manner IV: PDCCH subframes in a cell where retransmission is triggered are counted, wherein the uplink/downlink collision subframe is not comprised in the PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe for counting.

Preferably, when the available subframes are the ones of Msg1 in a noncompetitive random access process, the available subframe determining component 12 takes the first uplink subframe satisfying the following two conditions and having an available packet random access channel resource as an available subframe of the Msg1:

condition I: the subframe number is $n+k_2$;

wherein, n represents a subframe number of a subframe from which a PDCCH order is received by the UE, $k_2$ is a preset variable, and $k_2 \geq 6$;

condition II: in a cell sending a random access preamble, an uplink subframe is an uplink/downlink non-collision subframe or an uplink/downlink collision subframe capable of performing uplink transmission in the cell;

Preferably, when the available subframes are the ones of Msg3 in a competitive random access process, if a UL delay field is 0, the available subframe determining component 12 takes the first uplink subframe satisfying the following two conditions as an available subframe of the Msg3:

condition I: the subframe number is $n+k_1$;

wherein, n represents a subframe number of a subframe from which a random access response is received by the UE, $k_1$ is a preset variable, and $k_1 \geq 6$.

condition II: in a cell sending the Msg3, an uplink subframe is an uplink/downlink non-collision subframe or an uplink/downlink collision subframe capable of performing uplink transmission in the cell:

Preferably, when the available subframes are the ones of Msg3 in the competitive random access process, if the UL delay field is 1, the available subframe determining component 12 takes the non-first (second) uplink subframe satisfying the following two conditions as an available subframe of the Msg3:

condition I: the subframe number is $n+k_1$;

wherein, n represents a subframe number of a subframe from which a random access response is received by the UE, $k_1$ is a preset variable, and $k_1 \geq 6$;

condition II: in a cell sending the Msg3, the uplink subframe is an uplink/downlink non-collision subframe or an uplink/downlink collision subframe capable of performing uplink transmission in the cell.

Preferably, the device also includes:

a capability reporting component 14, configured to inform an eNB of capability information on whether the UE supports simultaneous uplink and downlink data transmission in the uplink/downlink collision subframe through capability reporting information.

Preferably, the device also includes:

a transmission manner determining component 15, configured to determine that the device is adopted for data transmission according to UE capability or signaling indication from the eNB.

Preferably, the device is UE.

Figure 8:
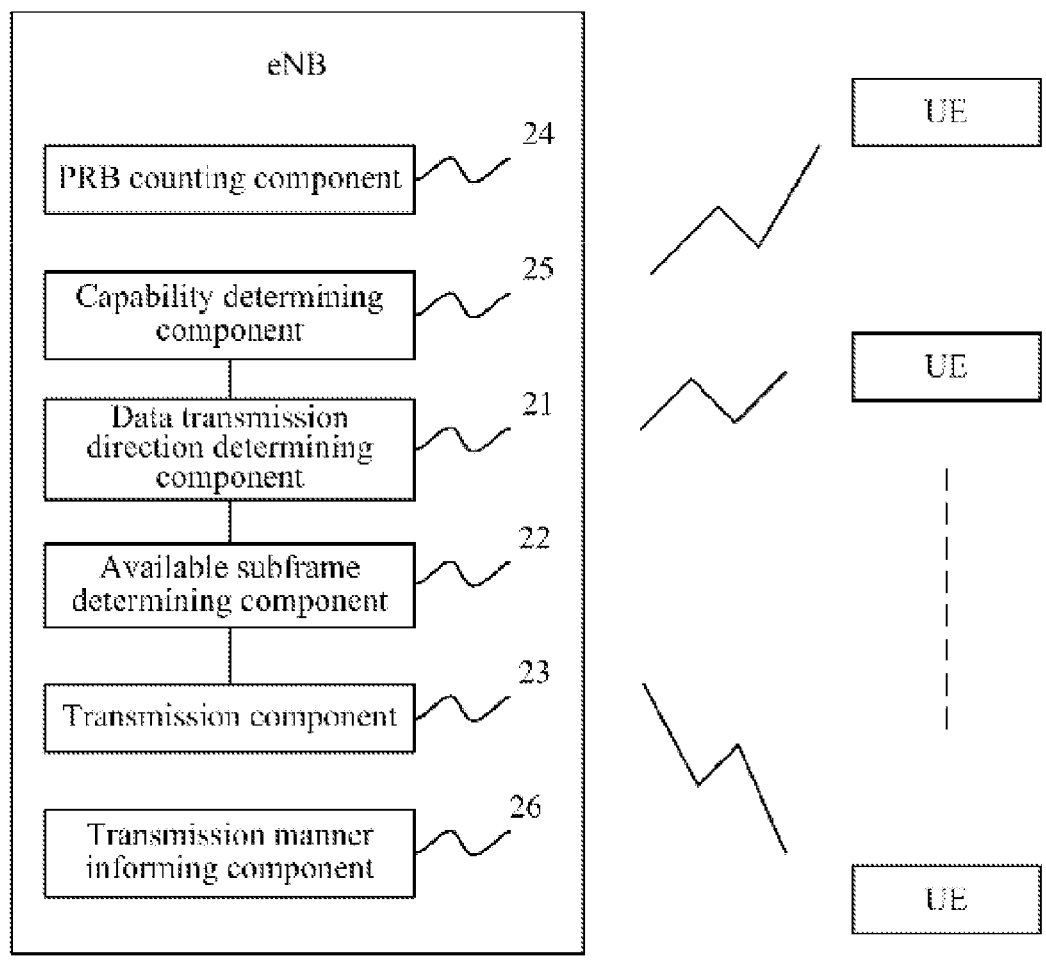
FIG. 8 is a schematic structural diagram of a data transmission device at a network/eNB side according to an embodiment of the present invention.

At an eNB side, with reference to FIG. 8, a data transmission device according to an embodiment of the present invention includes:

a data transmission direction determining component 21, configured to, when time division duplex uplink/downlink configurations of a plurality of cells aggregated by UE are different and only unidirectional data transmission is allowed in an uplink/downlink collision subframe, determine an allowed data transmission direction of the uplink/downlink collision subframe for an eNB, wherein data transmission directions of the same uplink/downlink collision subframe in the time division duplex uplink/downlink configurations of the plurality of cells aggregated by the UE are different;

an available subframe determining component 22, configured to determine available subframes in the uplink data transmission direction and available subframes in the downlink data transmission direction in each cell aggregated by the UE respectively, wherein available subframes determined in a data transmission direction opposite to the allowed data transmission direction do not include the uplink/downlink collision subframe; and a transmission component 23, configured to perform data transmission in the available subframes.

Preferably, when the available subframes are PDCCH subframes, the available subframes determined by the available subframe determining component 22 in each cell aggregated by the UE include:

all downlink subframes or all downlink subframes including DwPTS, including PDCCH or RN R-PDCCH or E-PDCCH in the cell; or, all non-collision subframes including PDCCH or R-PDCCH or E-PDCCH in the cell, and uplink/downlink collision subframes capable of performing downlink transmission and including the PDCCH or R-PDCCH or E-PDCCH.

Preferably, the available subframe determining component 22 counts the running time length of a DRX timer taking a PDCCH subframe as a length counting unit by adopting one of the following manners:

manner I: PDCCH subframes in a union or an intersection of PDCCH subframes in all the cells aggregated by the UE are counted, wherein the uplink/downlink collision subframe is not comprised in the counted PDCCH subframes, or, when the uplink/downlink collision subframe is used for downlink data transmission in a cell and comprises the PDCCH or R-PDCCH or E-PDCCH, the uplink/downlink collision subframe is used as a PDCCH subframe of the cell for counting;

manner II: PDCCH subframes in a PCell of the UE are counted, wherein the uplink/downlink collision subframe is not comprised in the counted PDCCH subframes, or, when the uplink/downlink collision subframe is capable of performing downlink transmission in the PCell and comprises the PDCCH or R-PDCCH or E-PDCCH, the uplink/downlink collision subframe is used as a PDCCH subframe for counting;

manner III: PDCCH subframes in a cell with most or least PDCCH subframes are counted, wherein the uplink/downlink collision subframe is not comprised in the counted PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe of the cell for counting.

Preferably, when the DRX timer is a drx-Retransmission-Timer, the manners of counting the PDCCH subframes also include:

manner IV: PDCCH subframes in a cell where retransmission is triggered are counted, wherein the uplink/downlink collision subframe is not comprised in the PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe for counting.

Preferably, when the available subframes are the ones of Msg1 in a noncompetitive random access process, the available subframe determining component 22 takes the first uplink subframe satisfying the following two conditions and having an available packet random access channel resource as an available subframe of the Msg1:

condition I: the subframe number is n+$k_2$;

wherein, n represents a subframe number of a subframe from which a PDCCH order is received by the UE, $k_2$ is a preset variable, and $k_2 \geq 6$:

condition II: in a cell sending a random access preamble, an uplink subframe is an uplink/downlink non-collision subframe or an uplink/downlink collision subframe capable of performing uplink transmission in the cell:

Preferably, when the available subframes are the ones of Msg3 in a competitive random access process, if a UL delay field is 0, the available subframe determining component 22 takes the first uplink subframe satisfying the following two conditions as an available subframe of the Msg3:

condition I: the subframe number is n+$k_1$;

wherein, n represents a subframe number of a subframe from which a random access response is received by the UE, $k_1$ is a preset variable, and $k_1 \geq 6$;

condition II: in a cell sending the Msg3, an uplink subframe is an uplink/downlink non-collision subframe or an uplink/downlink collision subframe capable of performing uplink transmission in the cell;

Preferably, when the available subframes are the ones of Msg3 in the competitive random access process, if the UL delay field is 1, the available subframe determining component 22 takes the second uplink subframe satisfying the following two conditions as an available subframe of the Msg3:

condition I: the subframe number is n+$k_1$;

wherein, n represents a subframe number of a subframe from which a random access response is received by the UE, $k_1$ is a preset variable, and $k_1 \geq 6$;

condition II: in a cell sending the Msg3, the uplink subframe is an uplink/downlink non-collision subframe or an uplink/downlink collision subframe capable of performing uplink transmission in the cell.

Preferably, the device also includes:

a PRB counting component 24, configured to determine all available PRBs within time T by adopting one of the following manners when the eNB needs to measure total PRB usage and PRB usage per traffic class:

manner I: the sum of PRBs comprised in subframes, a transmission direction of which is same as a counting transmission direction, in all cells within the time T is calculated, wherein PRBs comprised in the uplink/downlink collision subframe are not counted;

manner II: the sum of PRBs comprised in subframes, a transmission direction of which is same as a counting transmission direction, in all cells within the time T is calculated, wherein when the determined allowed data transmission direction of the uplink/downlink collision subframe is same as the counting transmission direction, the number of PRBs comprised in the uplink/downlink collision subframe in a cell capable of performing data transmission in the counting transmission direction is counted.

Preferably, the device also includes:

a capability determining component 25, configured to determine that the device is adopted for data transmission according to UE capability reported by the UE.

Preferably, the device also includes:

a transmission manner informing component 26, configured to determine whether the UE needs to perform parallel transmission in uplink/downlink collision subframes according to the UE capability or a preset rule, and inform the UE of the determination result through signaling.

Preferably, the device is an eNB.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the essence and scope of the invention. Thus the invention is also intended to encompass these modifications and variations thereto so long as the modifications and variations come into the scope of the claims appended to the invention and their equivalents.

The invention claimed is:

1. A data transmission method, comprising:

when time division duplex uplink/downlink configurations of a plurality of cells aggregated by a user equipment, UE, are different and only unidirectional data transmission is allowed in an uplink/downlink collision subframe, determining, by the UE, an allowed data transmission direction of the uplink/downlink collision subframe, wherein if transmission directions of a subframe in different cells aggregated by the UE are different, the subframe is referred to as an uplink/downlink collision subframe;

determining, by the UE, available subframes in an uplink data transmission direction and available subframes in a downlink data transmission direction in each cell aggregated by the UE respectively, wherein available subframes determined in a data transmission direction opposite to the allowed data transmission direction do not comprise the uplink/downlink collision subframe; and transmitting, by the UE, data in the available subframes in the uplink data transmission direction, and receiving data in the available subframes in the downlink data transmission direction.

2. The method of claim 1, wherein the available subframes are Physical Downlink Control Channel, PDCCH, subframes, and the available subframes determined by the UE in each cell aggregated by the UE comprise:

all downlink subframes comprising PDCCH, or Relay Node, RN, dedicated Physical Downlink Control Channel, R-PDCCH, or Enhanced Physical Downlink Control Channel, E-PDCCH in the cell, or all downlink subframes including downlink pilot time slot, DwPTS, comprising PDCCH or R-PDCCH or E-PDCCH in the cell; or, all non-collision subframes comprising PDCCH or R-PDCCH or E-PDCCH in the cell, and uplink/downlink collision subframes capable of performing downlink transmission and comprising the PDCCH or R-PDCCH or E-PDCCH.

3. The method of claim 2, wherein a running time length of a Discontinuous Reception, DRX, timer taking a PDCCH subframe as a length counting unit is counted by adopting one of the following manners:

manner I: PDCCH subframes in a union or an intersection of PDCCH subframes in all the cells aggregated by the UE are counted, wherein the uplink/downlink collision subframe is not comprised in the counted PDCCH subframes, or, when the uplink/downlink collision subframe is used for downlink data transmission in a cell and comprises the PDCCH or R-PDCCH or E-PDCCH, the uplink/downlink collision subframe is used as a PDCCH subframe of the cell for counting;

manner II: PDCCH subframes in a Primary Cell, PCell, of the UE are counted, wherein the uplink/downlink collision subframe is not comprised in the counted PDCCH subframes, or, when the uplink/downlink collision subframe is capable of performing downlink transmission in the PCell and comprises the PDCCH or R-PDCCH or E-PDCCH, the uplink/downlink collision subframe is used as a PDCCH subframe for counting;

manner III: PDCCH subframes in a cell with most or least PDCCH subframes are counted, wherein the uplink/downlink collision subframe is not comprised in the counted PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe of the cell for counting.

4. The method of claim 3, wherein the DRX timer is a discontinuous reception-retransmission timer, drx-RetransmissionTimer, and PDCCH subframes are counted in the following manner:

manner IV: PDCCH subframes in a cell where retransmission is triggered are counted, wherein the uplink/downlink collision subframe is not comprised in the PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe for counting.

5. The method of claim 1, wherein, when the available subframes are the ones of first message Msg1 in a noncompetitive random access process, a first uplink subframe satisfying the following two conditions and having an available packet random access channel resource is used as an available subframe of the Msg1:

condition I: a subframe number is $n+k_2$;

wherein, n represents a subframe number of a subframe from which a PDCCH order is received by the UE, $k_2$ is a preset variable, n is an integer not less than zero and $k_2 \geq 6$;

condition II: in a cell sending a random access preamble, an uplink subframe is an uplink/downlink non-collision subframe or an uplink/downlink collision subframe capable of performing uplink transmission in the cell;

when the available subframes are the ones of third message Msg3 in a competitive random access process, if a UL delay field is 0, a first uplink subframe satisfying the following two conditions is used as an available subframe of the Msg3:

condition I: a subframe number is $n+k_1$;

wherein, n represents a subframe number of a subframe from which a random access response is received by the UE, $k_1$ is a preset variable, and $k_1 \geq 6$;

condition II: in a cell sending the Msg3, an uplink subframe is an uplink/downlink non-collision subframe or an uplink/downlink collision subframe capable of performing uplink transmission in the cell;

when the available subframes are the ones of Msg3 in the competitive random access process, if the UL delay field is 1, a second uplink subframe satisfying the following two conditions is used as an available subframe of the Msg3:

condition I: a subframe number is $n+k_1$;

wherein, n represents a subframe number of a subframe from which a random access response is received by the UE, $k_1$ is a preset variable, and $k_1 \geq 6$;

condition II: in a cell sending the Msg3, the uplink subframe is an uplink/downlink non-collision subframe or an uplink/downlink collision subframe capable of performing uplink transmission in the cell.

6. The method of claim 1, further comprising:

informing, by the UE through capability reporting information, an Evolved Node B, eNB of capability information on whether the UE supports both uplink and downlink data transmission in the uplink/downlink collision subframe.

7. The method of claim 1, further comprising:

determining, by the UE according to signaling indication from the eNB, whether the UE needs to perform parallel transmission in the uplink/downlink collision subframe.

8. A data transmission method, comprising:

when time division duplex uplink/downlink configurations of a plurality of cells aggregated by a User Equipment, UE, are different and only unidirectional data transmission is allowed in an uplink/downlink collision subframe, determining, by an Evolved Node B, eNB, an allowed data transmission direction of the uplink/downlink collision subframe, wherein if transmission directions of a subframe in different cells aggregated by the UE are different, the subframe is referred to as an uplink/downlink collision subframe;

determining, by the eNB, available subframes in an uplink data transmission direction and available subframes in a downlink data transmission direction in each cell aggregated by the UE respectively, wherein available subframes determined in a data transmission direction opposite to the allowed data transmission direction do not comprise the uplink/downlink collision subframe; and transmitting, by the eNB, data in the available subframes in the downlink data transmission direction, and receiving data in the available subframes in the uplink data transmission direction.

9. The method of claim 8, wherein the available subframes are Physical Downlink Control Channel, PDCCH, subframes;

the available subframes determined by the eNB in each cell aggregated by the UE comprise:

all downlink subframes comprising PDCCH, or Relay Node, RN, dedicated Physical Downlink Control Channel, R-PDCCH, or Enhanced Physical Downlink Control Channel, E-PDCCH in the cell, or all downlink subframes including downlink pilot time slot, DwPTS, comprising PDCCH or R-PDCCH or E-PDCCH in the cell; or, all non-collision subframes comprising PDCCH or R-PDCCH or E-PDCCH in the cell, and uplink/downlink collision subframes capable of performing downlink transmission and comprising the PDCCH or R-PDCCH or E-PDCCH.

10. The method of claim 9, wherein a running time length of a Discontinuous Reception, DRX, timer taking a PDCCH subframe as a length counting unit is counted by adopting one of the following manners:

manner I: PDCCH subframes in a union or an intersection of PDCCH subframes in all the cells aggregated by the UE are counted, wherein the uplink/downlink collision subframe is not comprised in the counted PDCCH subframes, or, when the uplink/downlink collision subframe is used for downlink data transmission in a cell and comprises the PDCCH or R-PDCCH or E-PDCCH, the uplink/downlink collision subframe is used as a PDCCH subframe of the cell for counting;

manner II: PDCCH subframes in a Primary Cell, PCell, of the UE are counted, wherein the uplink/downlink collision subframe is not comprised in the counted PDCCH subframes, or, when the uplink/downlink collision subframe is capable of performing downlink transmission in the PCell and comprises the PDCCH or R-PDCCH or E-PDCCH, the uplink/downlink collision subframe is used as a PDCCH subframe for counting;

manner III: PDCCH subframes in a cell with most or least PDCCH subframes are counted, wherein the uplink/downlink collision subframe is not comprised in the counted PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe of the cell for counting; and when the DRX timer is a drx-RetransmissionTimer, PDCCH subframes are counted in the following manner:

manner IV: PDCCH subframes in a cell where retransmission is triggered are counted, wherein the uplink/downlink collision subframe is not comprised in the PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe for counting.

11. The method of claim 8, wherein, when the available subframes are the ones of first message Msg1 in a noncompetitive random access process, the eNB takes a first uplink subframe satisfying the following two conditions and having an available packet random access channel resource as an available subframe of the Msg1:

condition I: a subframe number is $n+k_2$;

wherein, n represents a subframe number of a subframe from which a PDCCH order is received by the UE, $k_2$ is a preset variable, n is an integer not less than zero and $k_2 \geq 6$;

condition II: in a cell sending a random access preamble, an uplink subframe is an uplink/downlink non-collision subframe or an uplink/downlink collision subframe capable of performing uplink transmission in the cell;

when the available subframes are the ones of third message Msg3 in a competitive random access process, if a UL delay field is 0, the eNB takes a first uplink subframe satisfying the following two conditions as an available subframe of the Msg3:

condition I: a subframe number is $n+k_1$;

wherein, n represents a subframe number of a subframe from which a random access response is received by the UE, $k_1$ is a preset variable, and $k_1 \geq 6$;

condition II: in a cell sending the Msg3, an uplink subframe is an uplink/downlink non-collision subframe or an uplink/downlink collision subframe capable of performing uplink transmission in the cell;

when the available subframes are the ones of Msg3 in the competitive random access process, if the UL delay field is 1, he eNB takes a second uplink subframe satisfying the following two conditions as an available subframe of the Msg3:

condition I: a subframe number is $n+k_1$;

wherein, n represents a subframe number of a subframe from which a random access response is received by the UE, $k_1$ is a preset variable, and $k_1 \geq 6$;

condition II: in a cell sending the Msg3, the uplink subframe is an uplink/downlink non-collision subframe or an uplink/downlink collision subframe capable of performing uplink transmission in the cell.

12. The method of claim 8, wherein when the eNB needs to measure total Physical Resource Block, PRB, usage and PRB usage per traffic class, all available PRBs within time T are determined by adopting one of the following manners:

manner I: a sum of PRBs comprised in subframes, a transmission direction of which is same as a counting transmission direction, in all cells within the time T is calculated, wherein PRBs comprised in the uplink/downlink collision subframe are not counted;

manner II: the sum of PRBs comprised in subframes, a transmission direction of which is same as a counting transmission direction, in all cells within the time T is calculated, wherein when the determined allowed data transmission direction of the uplink/downlink collision subframe is same as the counting transmission direction, the number of PRBs comprised in the uplink/downlink collision subframe in a cell capable of performing data transmission in the counting transmission direction is counted.

13. The method of claim 8, further comprising:

determining, by the eNB according to UE capability or a preset rule, whether the UE needs to perform parallel transmission in the uplink/downlink collision subframe, and informing the UE of the determination result through signaling.

14. A data transmission device, comprising:
a data transmission direction determining component, configured to, when time division duplex uplink/downlink configurations of a plurality of cells aggregated by a User Equipment, UE, are different and only unidirectional data transmission is allowed in an uplink/downlink collision subframe, determine an allowed data transmission direction of the uplink/downlink collision subframe for the UE, wherein if transmission directions of a subframe in different cells aggregated by the UE are different, the subframe is referred to as an uplink/downlink collision subframe;
an available subframe determining component, configured to determine available subframes in an uplink data transmission direction and available subframes in a downlink data transmission direction in each cell aggregated by the UE respectively, wherein available subframes determined in a data transmission direction opposite to the allowed data transmission direction do not comprise the uplink/downlink collision subframe; and
a transmission component, configured to transmit data in the available subframes in the uplink data transmission direction, and receive data in the available subframes in the downlink data transmission direction.

15. The device of claim 14, wherein when the available subframes are Physical Downlink Control Channel, PDCCH, subframes, the available subframes determined by the available subframe determining component comprise:
all downlink subframes comprising PDCCH, or Relay Node, RN, dedicated Physical Downlink Control Channel, R-PDCCH, or Enhanced Physical Downlink Control Channel, E-PDCCH in the cell, or all downlink subframes including downlink pilot time slot, DwPTS, comprising PDCCH or R-PDCCH or E-PDCCH in the cell; or,
all non-collision subframes comprising PDCCH or R-PDCCH or E-PDCCH in the cell, and uplink/downlink collision subframes capable of performing downlink transmission and comprising the PDCCH or R-PDCCH or E-PDCCH.

16. The device of claim 15, wherein,
the available subframe determining component counts a running time length of a Discontinuous Reception, DRX, timer taking a PDCCH subframe as a length counting unit by adopting one of the following manners:
manner I: PDCCH subframes in a union or an intersection of PDCCH subframes in all the cells aggregated by the UE are counted, wherein the uplink/downlink collision subframe is not comprised in the counted PDCCH subframes, or, when the uplink/downlink collision subframe is used for downlink data transmission in a cell and comprises the PDCCH or R-PDCCH or E-PDCCH, the uplink/downlink collision subframe is used as a PDCCH subframe of the cell for counting;
manner II: PDCCH subframes in a Primary Cell, PCell, of the UE are counted, wherein the uplink/downlink collision subframe is not comprised in the counted PDCCH subframes, or, when the uplink/downlink collision subframe is capable of performing downlink transmission in the PCell and comprises the PDCCH or R-PDCCH or E-PDCCH, the uplink/downlink collision subframe is used as a PDCCH subframe for counting;
manner III: PDCCH subframes in a cell with most or least PDCCH subframes are counted, wherein the uplink/downlink collision subframe is not comprised in the counted PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe of the cell for counting; and
when the DRX timer is a drx-RetransmissionTimer, the available subframe determining component counts PDCCH subframes in the following manner:
manner IV: PDCCH subframes in a cell where retransmission is triggered are counted, wherein the uplink/downlink collision subframe is not comprised in the PDCCH subframes, or, when the uplink/downlink collision subframe is capable of performing downlink transmission in a cell and comprises the PDCCH or R-PDCCH or E-PDCCH, the uplink/downlink collision subframe is used as a PDCCH subframe for counting.

17. The device of claim 14, wherein,
when the available subframes are the ones of first message Msg1 in a noncompetitive random access process, the available subframe determining component takes a first uplink subframe satisfying the following two conditions and having an available packet random access channel resource as an available subframe of the Msg1:
condition I: a subframe number is $n+k_2$;
wherein, n represents a subframe number of a subframe from which a PDCCH order is received by the UE, $k_2$ is a preset variable, n is an integer not less than zero and $k_2 \geq 6$;
condition II: in a cell sending a random access preamble, an uplink subframe is an uplink/downlink non-collision subframe or an uplink/downlink collision subframe capable of performing uplink transmission in the cell;
when the available subframes are the ones of third message Msg3 in a competitive random access process, if a UL delay field is 0, the available subframe determining component takes a first uplink subframe satisfying the following two conditions as an available subframe of the Msg3:
condition I: a subframe number is $n+k_1$;
wherein, n represents a subframe number of a subframe from which a random access response is received by the UE, $k_1$ is a preset variable, and $k_1 \geq 6$;
condition II: in a cell sending the Msg3, an uplink subframe is an uplink/downlink non-collision subframe or an uplink/downlink collision subframe capable of performing uplink transmission in the cell;
when the available subframes are the ones of Msg3 in the competitive random access process, if the UL delay field is 1, the available subframe determining component takes a second uplink subframe satisfying the following two conditions as an available subframe of the Msg3:
condition I: a subframe number is $n+k_1$;
wherein, n represents a subframe number of a subframe from which a random access response is received by the UE, $k_1$ is a preset variable, and $k_1 \geq 6$;
condition II: in a cell sending the Msg3, the uplink subframe is an uplink/downlink non-collision subframe or an uplink/downlink collision subframe capable of performing uplink transmission in the cell.

18. The device of claim 14, further comprising:
a capability reporting component, configured to inform, through capability reporting information, an Evolved Node B, eNB, of capability information on whether the UE supports both uplink and downlink data transmission in the uplink/downlink collision subframe.

19. The device of claim 16, further comprising:
a transmission manner determining component, configured to determine, according to signaling indication from the eNB, whether the UE needs to perform parallel transmission in the uplink/downlink collision subframe.

\* \* \* \* \*